US009242389B2

(12) United States Patent
Dillon

(10) Patent No.: US 9,242,389 B2
(45) Date of Patent: Jan. 26, 2016

(54) DRAW DOWN PAINT SAMPLE CARD AND METHODS

(75) Inventor: Robert Lloyd Dillon, Edina, MN (US)

(73) Assignee: The Dillon Group, Inc., Minneapolis, MN (US)

( * ) Notice: Subject to any disclaimer, the term of this patent is extended or adjusted under 35 U.S.C. 154(b) by 708 days.

(21) Appl. No.: 13/356,282

(22) Filed: Jan. 23, 2012

(65) Prior Publication Data

US 2013/0189651 A1 Jul. 25, 2013

(51) Int. Cl.
*G01J 3/52* (2006.01)
*B26F 3/02* (2006.01)

(52) U.S. Cl.
CPC . *B26F 3/02* (2013.01); *Y10T 225/10* (2015.04)

(58) Field of Classification Search
CPC ............................ B44D 3/003; G09B 19/0023
USPC ............................................................ 434/98
See application file for complete search history.

(56) References Cited

U.S. PATENT DOCUMENTS

| | | | | |
|---|---|---|---|---|
| 402,849 | A | 5/1889 | Owen | |
| 699,370 | A | 5/1902 | Connor | |
| 703,319 | A | 6/1902 | Tallqvist | |
| 2,081,735 | A | 5/1937 | Caronia | |
| 2,151,183 | A * | 3/1939 | Bradley, Jr. et al. | 15/245.1 |
| 3,782,327 | A | 1/1974 | Wessells et al. | |
| 3,832,070 | A | 8/1974 | Cox | |
| 3,930,924 | A | 1/1976 | Oka et al. | |
| 3,967,009 | A | 6/1976 | Blake | |
| 4,359,013 | A | 11/1982 | Prevo | |
| 4,494,479 | A | 1/1985 | Drury et al. | |
| 4,516,522 | A | 5/1985 | Drury et al. | |
| 4,523,852 | A | 6/1985 | Bauer | |
| 4,846,503 | A | 7/1989 | Strauss | |
| 4,869,200 | A * | 9/1989 | Euverard | 118/200 |
| 4,909,632 | A | 3/1990 | Simpson | |
| 4,992,050 | A * | 2/1991 | Edwards | 434/98 |
| 5,056,826 | A | 10/1991 | Suwa | |
| 5,217,377 | A | 6/1993 | Little, Jr. | |
| 5,217,744 | A | 6/1993 | Little, Jr. | |
| 5,728,427 | A | 3/1998 | Akkerman et al. | |
| 5,830,534 | A * | 11/1998 | Dillon | 427/277 |
| 5,855,480 | A * | 1/1999 | Housman | 434/75 |
| 5,985,413 | A | 11/1999 | Boyle et al. | |
| 6,217,934 | B1 | 4/2001 | Eilenberger | |
| 6,270,123 | B1 | 8/2001 | Spangler | |
| 6,416,612 | B1 * | 7/2002 | Lerner et al. | 156/277 |
| 6,924,817 | B2 | 8/2005 | Rice et al. | |
| 6,994,553 | B2 * | 2/2006 | DaRif et al. | 434/98 |
| 7,005,171 | B2 | 2/2006 | Lerner et al. | |
| 7,622,175 | B2 | 11/2009 | Pallotta et al. | |
| 7,709,070 | B2 | 5/2010 | Kinsey et al. | |

(Continued)

*Primary Examiner* — Robert J Utama
(74) *Attorney, Agent, or Firm* — Fredrikson & Byron, P.A.

(57) ABSTRACT

Draw down paint sample cards, methods of making draw down paint sample cards from fresh paint using draw down paint sample cards, and systems including draw down paint sample cards and draw down bars sized for use with the draw down paint sample cards. The draw down paint sample cards may include a first side perforated line adjacent to a first side edge, a second side perforated line adjacent to a second side edge, a bottom perforated line adjacent to a bottom edge, and optionally a top perforated line adjacent to a top edge. After application of a fresh paint sample to the draw down card using a draw down bar, the perforated lines allow one or more of the unpainted edges of the draw down paint sample card to be removed to create a final paint sample card with paint extending to one or more of the edges.

18 Claims, 5 Drawing Sheets

(56) References Cited

U.S. PATENT DOCUMENTS

| | | | | |
|---|---|---|---|---|
| 7,897,227 | B2 | 3/2011 | Steinhardt et al. | |
| 7,914,285 | B2 | 3/2011 | Boney | |
| 2003/0177598 | A1 | 9/2003 | Collins | |
| 2004/0004719 | A1 * | 1/2004 | Takada et al. | 356/421 |
| 2004/0181981 | A1 * | 9/2004 | DaRif et al. | 40/124.01 |
| 2005/0208456 | A1 * | 9/2005 | Swanick | 434/84 |
| 2007/0122612 | A1 * | 5/2007 | Young et al. | 428/343 |
| 2008/0014561 | A1 * | 1/2008 | Boney | 434/103 |
| 2008/0092457 | A1 | 4/2008 | Malone et al. | |
| 2009/0130302 | A1 | 5/2009 | Halfyard et al. | |
| 2010/0239752 | A1 * | 9/2010 | Serizawa et al. | 427/140 |
| 2013/0310968 | A1 * | 11/2013 | Gottenbos | 700/215 |

* cited by examiner

DRAW DOWN PAINT SAMPLE CARD AND METHODS

BACKGROUND

Paint samples are useful to both vendors and purchasers of paint. Pre-made cards, called paint chips, which are often provided as long strips displaying multiple colors, can be used by consumers for a preliminary evaluation. However, for many purposes, these pre-made cards are not adequate and actual fresh samples of the paint are preferred. For example, when paint is actually applied to a surface, the appearance may not be exactly the same as the paint chip. This may occur due to errors in formulating or mixing the paint, for example. A fresh paint sample may therefore be used to confirm correct color formulation and mixing, such as by comparison of the paint sample to the color chip. Other uses for fresh paint samples include the analysis of paints of unknown color. When the color of a paint is unknown, a fresh paint sample may be prepared and analyzed by a spectrophotometer. The spectrophotometer can then identify the color of the paint and provide to a computer the colorimetric data to create a formulation to reproduce the unknown paint color.

In order for the fresh paint sample to be most useful, such as for color matching and spectrophotometric analysis, the sample should be of a thickness adequate for evaluation and should also be of a uniform thickness. A quick method of preparing a fresh paint sample is to dip a finger into the paint and spread the paint on a piece of paper. However, besides being messy, such "finger smears" are often uneven, and this unevenness can lead to miscalculation by the spectrophotometer.

Draw down sample cards can be prepared to provide uniform fresh color samples. Such draw down samples cards can be prepared by applying a puddle of paint at one end of a sheet of paper and sliding a bar through the paint to spread the paint down the sheet. When prepared properly, the resulting sample will have a uniform thickness that is adequate for analysis. However, the preparation of draw down sample cards can be messy, with the paint sometimes running over the edges of the sheet as the bar is drawn down. When less paint is used, such that run over on the edges does not occur, there is a gap at the edge of the sheet. This unpainted margin around the edge of the sample interferes with visual matching and comparison of the sample to paint chips or other items, since the sample is not directly side-by-side with the item to which the color is compared, such as a paint chip, fabric, carpet, furniture piece, or other object. These unpainted margins can be removed, such as by cutting with a scissors, but this requires an extra step which is time consuming if done carefully, and can result in samples which are not uniform in size and/or have irregular edges and therefore appear less professional. An improved method of preparing paint samples would therefore be useful.

SUMMARY

Embodiments of the invention include draw down sample cards for creating sample cards using fresh paint. The draw down sample cards may include a top edge, a bottom edge opposing the top edge, first and second opposing side edges, a first surface for receiving a draw down sample of paint, and a second surface opposing the first surface. They may further include a first side perforated line adjacent to the first side edge, a second side perforated line adjacent to the second side edge and parallel to the first perforated line, a bottom perforated line adjacent to the bottom edge and perpendicular to the first and second side perforated lines, and optionally a top perforated line adjacent to the top edge and perpendicular to the first and second side perforated lines. The first side perforated line extends from the top edge or the top perforated line to at least the bottom perforated line, the second side perforated line extends from the top edge or the top perforated line to at least the bottom perforated line, and the bottom perforated line extends from at least the first perforated line to at least the second perforated line. In some embodiments, the first and/or second side perforated line extends from the top edge to the bottom edge. In some embodiments, the sample card includes the top perforated line, and the top perforated line extends from at least the first side perforated line to at least the second side perforated line. In some such embodiments, the top perforated line extends from the first side edge to the second side edge.

In some embodiments, the draw down sample card includes a first hole located adjacent to the top edge and between the first side edge and the first side perforated line and a second hole located adjacent to the top edge and between the second side edge and the second side perforated line. In some embodiments, the draw down sample card includes a guide marker comprising a straight line on the first surface adjacent to the top edge and parallel to the bottom perforated line. The guide marker may extend from a first end to a second end, the first end being located between the first side edge and the first side perforated line and the second end being located between the second side edge and the second side perforated line.

Other embodiments include systems or kits for creating paint sample card samples. The system may include a draw down sample card and a draw down bar. The draw down sample card may include a top edge, a bottom edge opposing the top edge, first and second opposing side edges, a first surface for receiving a draw down sample of paint, a second surface opposing the first surface, a first side perforated line adjacent to the first side edge, and a second side perforated line adjacent to the second side edge and parallel to the first perforated line. The draw down bar may include a paint application portion extending from a first end to a second end. The draw down bar may be sized for use with the draw down card such that the length of the paint application portion from the first to the second end is less than a perpendicular distance between the first and second side edges of the draw down card and is greater than a perpendicular distance between the first and second side perforated lines of the draw down card. In some embodiments, the draw down sample card also includes a bottom perforated line adjacent to the bottom edge and perpendicular to the first and second side perforated lines and/or a top perforated line adjacent to the top edge and perpendicular to the first and second side perforated lines. The first and second side perforated lines may extend from the top edge or the top perforated line to at least the bottom perforated line.

Other embodiments include methods of creating a paint sample card. The method may include depositing a puddle of paint on a draw down card, placing the draw down bar on the draw down card, the draw down bar having a paint application portion having a first end and a second end and a longitudinal axis, sliding the draw down bar toward the bottom edge of the draw down card so as to spread the paint on the card, and tearing the draw down card along the first and second side perforated lines. The draw down card may include a top edge, a bottom edge opposing the top edge, first and second opposing side edges, a first surface for receiving the sample of paint, and a second surface opposing the first surface. The draw down card may further include a first side perforated line adjacent to the first side edge, and a second side perforated line adjacent to the second side edge and parallel to the first perforated line. The draw down bar may be positioned such that the longitudinal axis is perpendicular to the first and second side perforated lines, the first end is between the first perforated line and the first edge, and the second end is between the second perforated line and the second edge, throughout the step of sliding the draw down bar toward the bottom edge. In some embodiments, the draw down card further includes a bottom perforated line adjacent to the bottom edge of the draw down card and/or a top perforated line adjacent to the top edge of the draw down card.

After sliding the draw down bar toward the bottom edge to spread the paint on the card, the method may include stopping sliding the draw down bar and removing the draw down bar from the card once the paint has spread past the bottom perforated line but before it has spread past the bottom edge of the card. In some embodiments, the method further includes tearing the draw down card along the bottom perforated line and/or along the top perforated line. The method may also include waiting for the paint to dry before tearing the draw down card along the first and second side perforated lines.

In some embodiments, the draw down card includes a first hole located adjacent to the top edge and between the first side edge and the first side perforated line and a second hole located adjacent to the top edge and between the second side edge and the second side perforated line. In some embodiments, the method also includes hanging the draw down card in a generally vertical orientation using the holes after the step of sliding the draw down bar toward the bottom edge and then waiting for the paint to dry before tearing the draw down card along the first and second side perforated lines. In some embodiments, the method also includes the step of placing the draw down card on a board having a set of projections such that the projections are inserted into the apertures of the card before depositing the paint sample onto the card.

In some embodiments, the draw down card includes a guide marker comprising a straight line on the first surface adjacent to the top edge, and the step of placing the draw down bar on the draw down card includes aligning the draw down bar or a portion thereof with the guide marker.

Other aspects, features, and advantages will be apparent from the following detailed description, including the drawings and the claims.

BRIEF DESCRIPTION OF FIGURES

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

DETAILED DESCRIPTION OF ILLUSTRATIVE EMBODIMENTS

Figure 1:
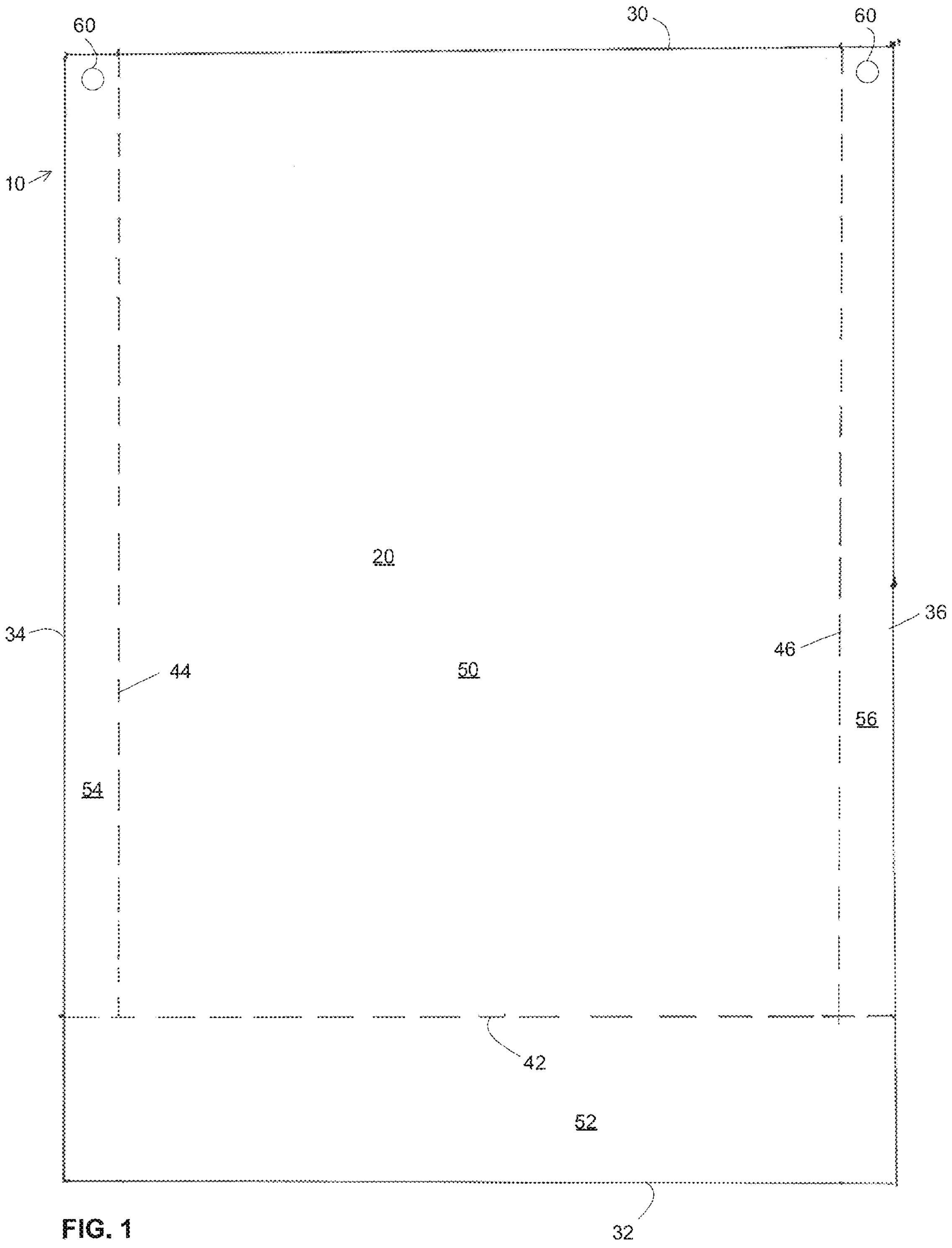
FIG. 1 is a draw down paint sample card according to embodiments of the invention.

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Embodiments of the invention include draw down cards, methods of using draw down cards to create fresh paint samples, and systems for making draw down paint samples. The draw down cards include one or more lines of perforation for removal of the unpainted card edges such that the cards can be used to provide fresh paint samples more easily and with less mess than other draw down cards.

The draw down card is generally square or rectangular in shape includes opposing top and bottom edges and first and second opposing side edges. One or more lines of perforations extend along the card, adjacent to one or more edges of the card. The perforated lines are located such that, when paint is applied to the card, the paint spreads across the perforated lines into the space between the perforated line and the edge of the card, but not beyond the edge of the card. In this way, the paint stays entirely on the card and does not run over the edges of the card, keeping the surface beneath the card clean. After the paint has been applied, one or more of the edges of the card can be removed by tearing them off along the perforated lines. By removing the edge, the unpainted portion of the card is removed such that the paint extends to the perforated line which becomes the new edge of the card which is now a paint sample card. If both side edges and the bottom edge are removed, the result is a paint sample card with paint extending across the entire surface, with no unpainted edge portions except for the top edge of the card. In some embodiments, both side edges, the bottom edge, and the top edge can be removed, leaving a final paint sample card which is completely covered by paint on one surface.

In some embodiments, a perforated line extends adjacent to each of the first and second side edges of the card forming side perforated lines. In some embodiments, an additional perforated line extends adjacent to the bottom edge of the card forming a bottom perforated line. In some embodiments, an additional perforated line extends adjacent to the top edge of the card forming a top perforated line. Any form of perforation which allows the card to be torn cleanly along the perforation may be used, such as a line of small holes extending through the card. The holes used in the perforation should be sized such that they are large enough to allow clean tearing along them but too small to allow paint to pass through them.

In some embodiments, the perforated lines extend fully to the edge of the card. For example, the side perforated lines may extend from the top edge to the bottom edge of the card. The bottom perforated line may extend from the first to the second side edge of the card. In other embodiments, one or more of the perforated lines may stop short of the edge of the card at one or both ends of the perforated line. For example, the perforated line may terminate at an intersection with another perforated line. In some such embodiments, the side perforated lines may extend from the top edge or the top perforated line to the bottom perforated line, and the bottom perforated line may extend from the first to the second side edge. In other such embodiments, the side perforated lines may extend from the top edge to the bottom edge of the card, and the top perforated line and the bottom perforated line may extend from the first side perforated edge to the second side perforated edge. In still other embodiments, the side perforated lines may extend from the top edge to the bottom perforated line where they terminate, and the bottom perforated line may extend from the first to the second side perforated line, such that none of the perforated lines extends to the side edges or the bottom edge. The exact configuration of the perforated lines may be any of these embodiments, or any combination thereof, that allows the side, bottom, and/or top edge portions of the card to be removed after the paint is applied.

The material used for the cards may be any sheet to which paint adheres and which may be separated by tearing along perforated lines. The sheet may be of any thickness or stiffness desired. For example, the card may be a paper, posterboard, or cardboard type of material. In some embodiments, paint may be applied to only one surface while in other embodiments, paint may be applied to both surfaces. The card may be white or colored. In some embodiments, the card includes both white and black portions (such as white and black halves) on one or both surfaces. The card may also include a top coat over one or both surfaces to make them more uniform, or the card may only be partially covered by a top coat, such as only on half of the card's surface.

Any type of draw down bar useful for making paint samples on draw down cards may be used in embodiments of the invention. Examples of such draw down bars include the Sample-Ease Draw Down Bar®, Bird Film Applicators® and various wire-wound draw down bars. Any draw down bar which can apply a paint sample of uniform thickness may be used in embodiments of the invention. Many draw down bars include a central paint application portion across which the paint spreads as it is drawn down the sheet and which ends at edge portions. The draw down bars may control the spread of the paint such that the paint does not spread peripherally beyond the central paint application portion but rather stops at the junctions of the central paint application portion and the end portions of the bar. The width of the paint sample applied by the draw down bar will then be the same as the width of the paint application portion of the draw down bar.

The draw down card according to various embodiments can be sized for use with a particular draw down bar or with any draw down bar having a paint application portion of a particular size or falling within a narrow range of sized. In such embodiments, the card is sized such that the draw down bar has a paint application portion which is less than the width of the draw down card (from first to second side edge) but is greater than the distance between the first and second side perforated lines. In this way, the card is sized such that the draw down bar creates a paint sample that extends across the side perforated lines but terminates inwardly of the side edges of the card. The edges of the applied paint sample lie in the side edge portions and the bottom edge portion of the card and can be removed when the side edge portion and bottom edge portion are removed by tearing along the perforated lines. In addition, the draw down bar can be stopped in the bottom edge portion such that excess paint can run onto the bottom portion and then be removed when the bottom portion is torn away. If the draw down card includes a top perforated line, the top portion can also be removed. In some embodiments, one or more cards are provided in a draw down paint sample system or kit along with a draw down bar, with the cards being sized for use with the draw down bar of the system as described herein.

In some embodiments, the card includes a guide mark, such as a line, near the top edge of the card. This guide mark can be used as a guide for the user for placement of the draw down bar during creation of the paint sample. The guide mark may extend from a location between the first side edge and the first side perforated line to a location between the second side edge and the second perforated line as a guide for placement of the draw down bar or the paint application portion of the draw down bar. The guide mark may be continuous, such as a continuous line, or discontinuous, such as a dashed line, for example. It may be an ink line or may be a groove or elevation pressed into the card, for example. If the draw down card includes a top perforated line, the top perforated line will be located below any draw down bar guide mark, such that the guide mark is between the top perforated line and the top edge. The location of the top perforated line is such that the portion of the draw down card immediately beneath and abutting the top perforated line and between the side perforated lines will be completely covered with paint.

The cards may further include one or more indications, such as words and/or lines, indicating where information about the paint may be written. Such indications may be near the top edge of the card, in the portion of the card to which paint would not be applied. For example, these indications may be between the guide mark and the top edge.

In some embodiments, the card may further include one or more holes extending through the card which are sized for hanging the cards to dry after the application of paint. In some embodiments, the card includes a single midline hole adjacent to or near the top edge of the card. In other embodiments, the card includes two holes adjacent to or near the top edge of the card and spaced away from the midline. In some such embodiments, one hole is located between the first side edge and the first side perforated line, and a second hole is located between the second side edge and the second side perforated line. In such embodiments, when the side edge portions of the card are removed, the holes are also removed, creating a cleaner looking finished sample card. The holes may be used for hanging the cards to dry after application of paint. They may also be used with pegs as a way of securely positioning the card during the application of a paint sample. In some embodiments, the system or kit includes one or more draw down cards along with a draw down bar and a board having projections such as pegs spaced for use with the draw down cards when applying a paint sample. The board includes an upper flat surface which may be generally horizontally oriented during use. The board may be sized for use with the draw down cards and may include a clamp, projections, or other form of releasable attachment at the top end of the board which may be used to secure the draw down card to the board before the application of the paint sample. In some embodiments, the attachment is two or more projections which extend approximately perpendicularly from the upper surface of the board and may be spaced apart by a distance equal to the distance between the apertures of the draw down card and may be sized to fit within the apertures of the draw down card. The projections may be located so as to securely align the draw down card with the board, such that the draw down card lies entirely on the upper surface of the board with no portion of the draw down card extending past an edge of the board. After the application of the paint sample, the draw down card may be removed from the board by lifting it off of the projections.

In some embodiments, the draw down card may include additional perforated lines extending through the sample portion of the card. These additional perforated lines may be used to divide the finished paint sample card into multiple smaller paint sample cards. For example, the draw down card may include a central longitudinal perforated line extending from the top edge or the top perforated line to the bottom edge or bottom perforated line, which may bisect the draw down card into two equal portions. The draw down card may further include a central transverse perforated line, perpendicular to the central longitudinal line and extending from the first side edge or first side perforated line to the second side edge or second side perforated line. The central transverse perforated line may bisect the sample portion of the card into two equal portions. Together the central longitudinal and central transverse perforated lines may be used to divide the final sample card into four smaller sample cards. Any number of additional perforated lines may be used to divide the final sample card into any number of smaller sample cards at any time after the application of the paint sample, such as after the paint sample has dried.

An example of a draw down card according to embodiments of the invention is shown in FIG. 1. The card 10 is a sheet having a first face 20 and an opposing second face (not shown). The margins of the card 10 are defined by a top edge 30 and an opposing and parallel bottom edge 32, and a first side edge 34 and an opposing and parallel second side edge 36.

The card 10 includes 3 perforated lines. Bottom perforated line 42 extends from first side edge 34 to second side edge 36 and parallel to bottom edge 32. First side perforated line 44 extends from top edge 30 to bottom perforated line 42 and is adjacent to and parallel to first side edge 34. Second side perforated line 46 extends from top edge 30 to bottom perforated line 42 and is adjacent to and parallel to the second side edge 36. First and second side perforated lines 44, 46 are parallel to each other and perpendicular to bottom perforated line 42.

The central portion of card 10 is the sample portion 50 and is defined by top edge 30, first and second side perforated lines 44, 46 and bottom perforated line 42. After paint is applied to the card 10, the majority of the sample portion will be entirely covered with paint, with paint extending across the card 10 from first side perforated line 44 to second side perforated line 46 and down to bottom perforated line 42, with only a small unpainted portion extending across along the top edge 30.

The remainder of the card 10 are edge portions which are removed from the sample portion 50 after the paint sample is applied to the card 10. A first side edge portion 54 is defined by the top edge 20, the bottom perforated line 42, the first side edge 34 and the first side perforated line 44. In alternative embodiments, the first side edge portion could extend to the bottom edge 32. A second side edge portion 56 is defined by the top edge 20, the bottom perforated line 42, the second side perforated line 46 and the second side edge 36. In alternative embodiments, the second side edge portion could extend to the bottom edge. A bottom edge portion 52 is defined by the bottom perforated line 42 and the bottom edge 32 and the first and second side edges 34, 36. In alternative embodiments, the sides of the bottom edge portion could be defined by the first and second side perforated lines 44, 46 rather than the first and second side edges 34, 36. In other embodiments, the card may also include a top perforated line that may extend from first side edge 34 to second side edge 36 or from first side perforated line 44 to second side perforated line 46.

Figure 3:
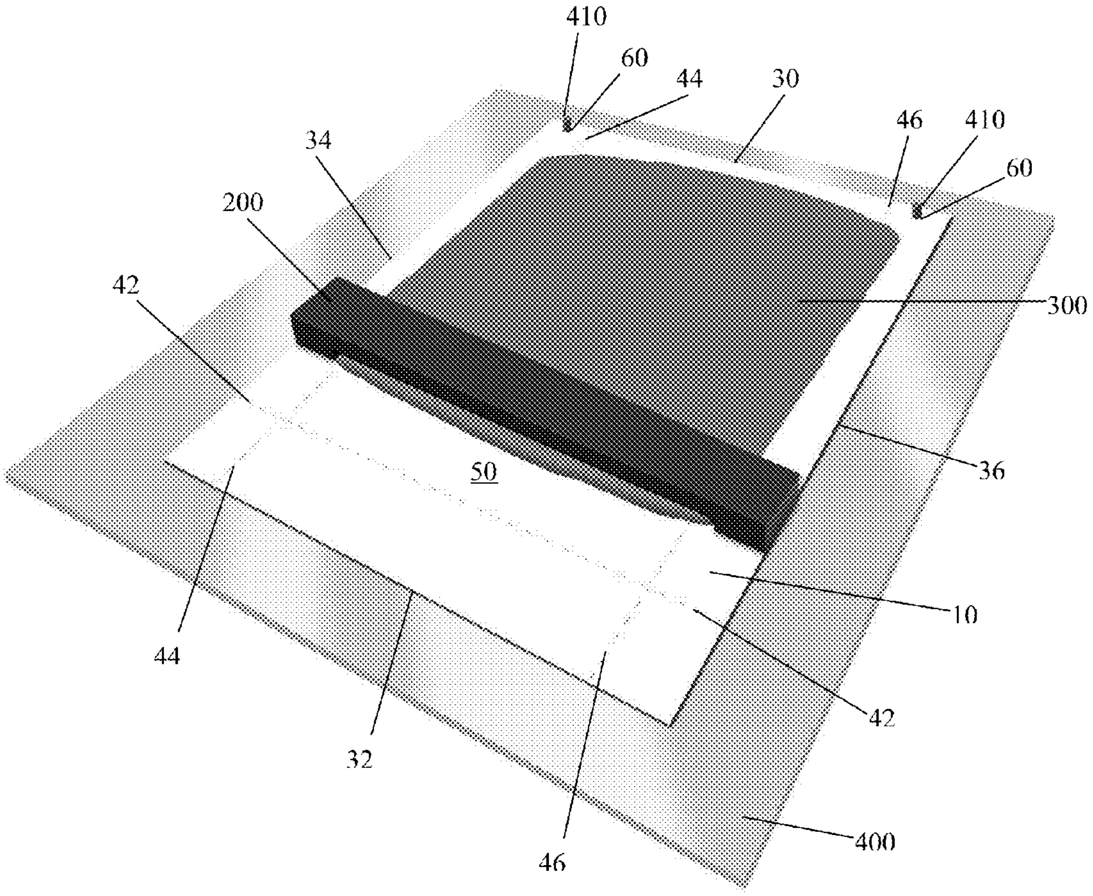
FIG. 3 is draw down sample card to which a fresh paint sample is being applied to the card according to embodiments of the invention.
Figure 4:
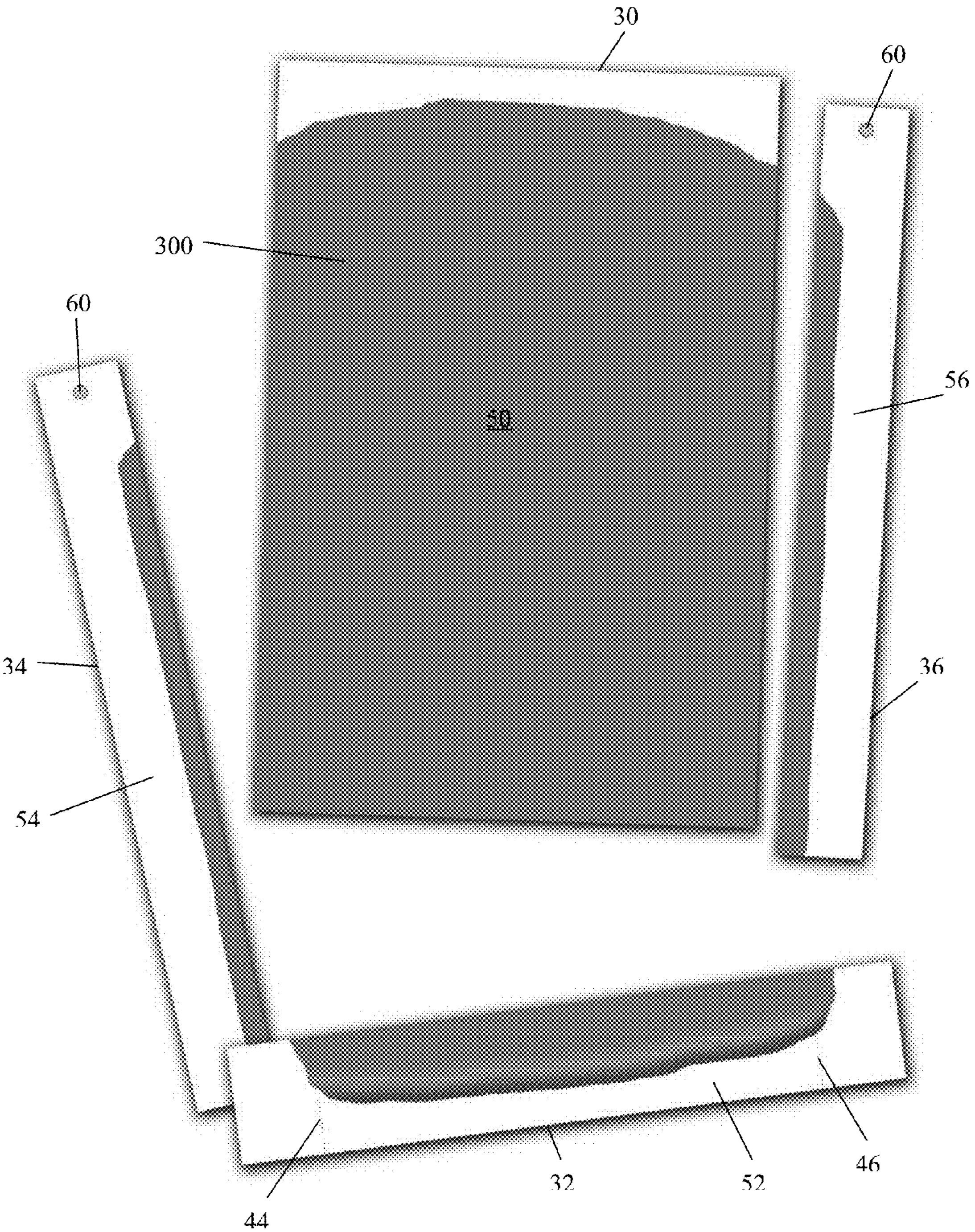
FIG. 4 is a draw down sample card to which a paint sample has been applied, with edge portions of the card removed according to embodiments of the invention.

As can be understood by reference to FIGS. 3 and 4, after a paint sample 300 is applied to the card 10, each of the edge portions 52, 54, 56 is partially painted and partially unpainted, with the outer edge of the paint lying between the perforated line and the edge of each portion. On the first side edge portion 54, the outer edge of the paint extends from the first side perforated line 44 to an area between the first side perforated line and the first side edge 34, except for an unpainted area adjacent to the top edge 30. On the second side edge portion 56, the outer edge of the paint extends from the second side perforated line to an area between the second side perforated line 46 and the second side edge 36, except for an unpainted area adjacent to the top edge. On the bottom edge portion 52, the outer edge of the paint extends from the bottom perforated line to an area between the bottom perforated line and the bottom edge 32, except for small unpainted areas adjacent to each of the first side edge 34 and the second side edge 36. These edge portions 52, 54, 56, can be removed from the sample portion 50 by tearing along the perforated lines 42, 44, 46.

In the embodiment shown in FIG. 1, the card 10 further includes two apertures 60 which allow the card to be hung upon a pair of rods after application of the paint sample while the paint is drying and can also be used to stabilize the card during paint application. The apertures are located adjacent to the top edge 30 in the area of the card 10 which remains unpainted. In this embodiment, one aperture 60 is located in the first side edge portion 54 and the other aperture is located in the second side edge portion 56. In this way, after the paint sample has dried and the first and second side edge portions 54, 56 are removed, the sample portion 50 has no aperture which may be more visually pleasing. However, the apertures may alternatively be located adjacent to the top edge 30 in the sample portion 50, or the card may include a single midline aperture.

Figure 2:
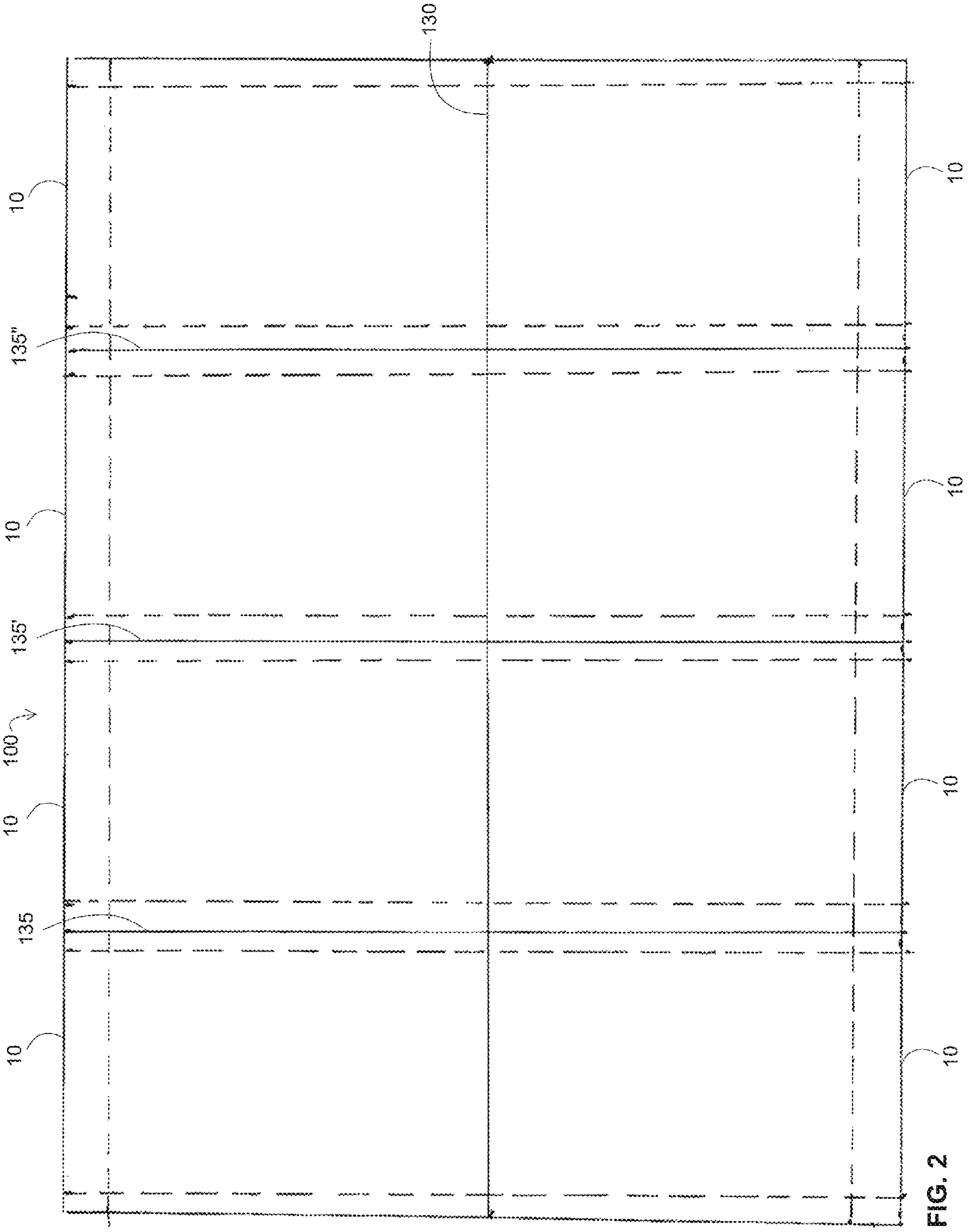
FIG. 2 is a sheet of multiple draw down paint sample cards according to embodiments of the invention.

The cards 10 may be manufactured from a single large sheet which is perforated and divided into multiple cards 10. An example of such a sheet is sheet 100 shown in FIG. 2. The sheet may first be perforated along the lines of perforation which extend across the cards 10 and are aligned with the perforated lines of adjacent cards 10. Sheet 100 can then be divided by cutting into multiple cards 10. Alternatively, the sheet 100 may be divided first and then the cards 10 may be perforated. In the example shown, the sheet forms 8 cards 10 when cutting is complete. By cutting along line 130, the bottom edges 32 of the cards 10 are formed. Cutting along lines 135, 135', 135" forms the first and second side edges 34, 36 of the cards 10. Various alternative card orientations may be used to easily manufacture multiple cards from a single sheet.

FIG. 3 depicts a sample of paint 300 being applied to a card 10 using a draw down bar 200 and a board 400. In use, the card 10 is first placed on a firm, flat, and generally horizontal surface. In the embodiment shown, the surface is a board 400 which is sized to be larger than the card and includes two pegs 410 for securing the card 10 which are spaced to align with apertures 60. A portion of paint is then deposited onto the card, near the top edge 30 of the card, such as in the form of a puddle of paint. A draw down bar 200 is then contacted with the card 10 such that the paint application portion 210 extends from the first side edge portion 54, across the sample portion 50, and to the second side edge portion 56 without extending past the first side edge 34 or second side edge 36. The draw down bar is generally oriented parallel to the top and bottom edges 30, 32 and bottom perforated line 42, and perpendicular to the side edges 34, 36 and the side perforated lines 44, 46. The location at which the bar 200 is contacted with the card may be above (toward the top edge 30, relative to the paint deposit) or within the paint deposit. The draw down bar 200 is then slid toward the bottom edge 32 of the card 10 as shown in FIG. 3, spreading the paint from the paint deposit across the sample portion 50 of the card 10, while maintaining the same positioning and orientation relative to the side edges 34, 36 and the side perforated lines 44, 46 of the card 10. The draw down bar 200 is slid until the paint has spread past the bottom perforated line and is stopped before the paint reaches the bottom edge 32 of the card. The draw down bar 200 is then removed from the card 10. The card 10 having the paint sample is then dried, such as by hanging the card using apertures 60. After the card is dry, the side edge portions 54, 56 and the bottom portion 52 are removed from the sample portion 50, as shown in FIG. 4, and sample portion 50 may then be used for color matching.

Figure 5:
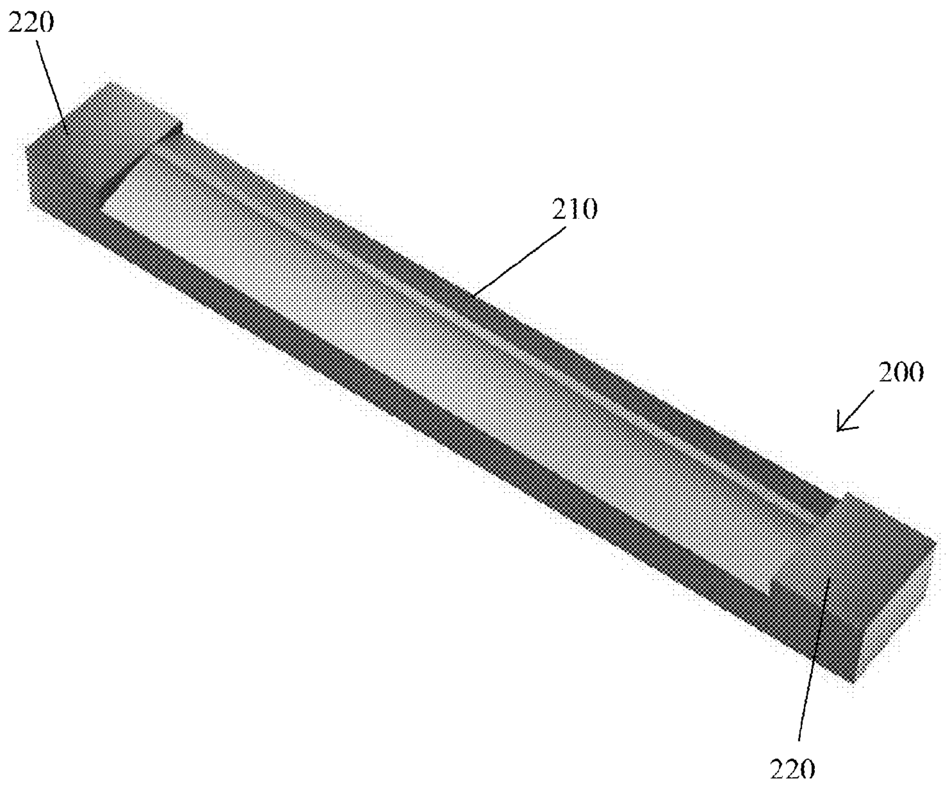
FIG. 5 is a perspective view of a draw down bar according to embodiments of the invention.

An example of a draw down bar 200 that may be used in embodiments of the invention is shown in FIG. 5. The draw down bar 200 extends longitudinally and has a central paint application portion 210 surrounded by two end portions 220 at each end of bar 200. The length of the paint application portion 210 of the draw down bar 200 is slightly greater than the width of the sample portion 50 (from first to second perforated line 44, 46) but less than the width of the card 10. In the embodiment shown in FIG. 3, the draw down bar has a total length approximately equal to the width of the card 10. When complete, the final paint sample cards made from the draw down cards 10 are completely painted, except for the top edge in some embodiments, and are uniform in size and have regular, straight edges for a more professional look. In other embodiments including a top perforated line, the top edge portion may also be removed, leaving a final paint sample card with no unpainted portion on the upper surface.

In some embodiments, the card 10 may have a length (from top edge 30 to bottom edge 32) of about 13 inches and a width (from first side edge 34 to second side edge 36) of about 10 inches. The sample portion 50 of the card may have a length of about 11¼ inches (from top edge 30 to bottom perforated line 42) and a width (from first perforated line 44 to second perforated line 46) of about 7½ inches. However, regardless of the size, the size of the card and the location of the perforated lines is designed such that, when used with a particular draw down bar, the width of the paint film path is greater than the width of the sample portion 50 but less than the width of the card 10.

In the foregoing detailed description, the invention has been described with reference to specific embodiments. However, it may be appreciated that various modifications and changes can be made without departing from the scope of the invention as set forth in the appended claims. Thus, some of the features of preferred embodiments described herein are not necessarily included in preferred embodiments of the invention which are intended for alternative uses.

What is claimed is:

1. A method of creating a paint sample card comprising:

depositing a puddle of paint on a draw down card, the draw down card comprising:
- a top edge;
- a bottom edge opposing the top edge;
- first and second opposing side edges;
- a first surface for receiving a draw down sample of paint;
- a second surface opposing the first surface;
- a first side perforated line adjacent to the first side edge;
- a second side perforated line adjacent to the second side edge and parallel to the first side perforated line; and
- a central portion defined on the first surface within the first side perforated line, a second side perforated line and the top edge, the puddle of paint being deposited at the central portion near the top edge;

placing the draw down bar on the draw down card, the draw down bar being positioned generally parallel to the top edge;

sliding the draw down bar toward the bottom edge of the draw down card so as to spread the paint on the card, the draw down bar being slid such that the draw down bar maintains the same orientation relative to the first and second side perforated lines;

tearing the draw down card along the first side perforated line to remove a first side portion of the card between the first side edge and the first side perforated line; and tearing the draw down card along the second side perforated line to remove a second side portion of the card between the second side edge and the second side perforated line.

2. The method of claim 1, wherein the draw down card further comprises a bottom perforated line adjacent to the bottom edge of the draw down card.

3. The method of claim 2, further comprising, after sliding the draw down bar toward the bottom edge to spread the paint on the card, stopping sliding the draw down bar once the paint has spread past the bottom perforated line but before it has spread past the bottom edge of the card and then tearing the draw down card along the bottom perforated line.

4. The method of claim 3 wherein the first and second side perforated lines extend to the top edge.

5. The method of claim 1 further comprising waiting for the paint to dry before tearing the draw down card along the first and second side perforated lines.

6. The method of claim 1, wherein the draw down card further comprises a first hole located adjacent to the top edge and in the first side portion and a second hole located adjacent to the top edge and in the second side portion, further comprising:

hanging the draw down card in a generally vertical orientation using the holes after the step of sliding the draw down bar toward the bottom edge; and then waiting for the paint to dry before tearing the draw down card along the first and second side perforated lines to remove the first and second side portions including the first and second holes.

7. The method of claim 1, wherein the draw down card further comprises a guide marker comprising a straight line on the first surface adjacent to the top edge, wherein the step of placing the draw down bar on the draw down card comprises aligning the draw down bar or a portion thereof with the guide marker.

8. The method of claim 1, wherein the draw down bar comprises a paint application portion having a first end and a second end, wherein the draw down bar is positioned such that the first end is between the first side perforated line and the first edge, and the second end is between the second side perforated line and the second edge.

9. The method of claim 8, further comprising sliding the draw down bar toward the bottom edge of the draw down card such that the paint is spread across the first and second side perforated lines into the first and second ends.

10. A method of creating a paint sample card comprising:

depositing a puddle of paint on a draw down card, the draw down card comprising:
- a top edge;
- a bottom edge opposing the top edge;
- first and second opposing side edges;
- a first surface for receiving a draw down sample of paint;
- a second surface opposing the first surface;

a first side perforated line adjacent to the first side edge; and a second side perforated line adjacent to the second side edge, the first and second side perforated lines extending in a direction from the top edge towards the bottom edge;

placing the draw down bar on the draw down card, the draw down bar being generally oriented parallel to the top and bottom edges, sliding the draw down bar toward the bottom edge of the draw down card so as to spread the paint on the card;

tearing the draw down card along the first side perforated line to remove a first side portion of the card between the first side edge and the first side perforated line; and tearing the draw down card along the second side perforated line to remove a second side portion of the card between the second side edge and the second side perforated line.

11. The method of claim 10, wherein the draw down card further comprises a bottom perforated line adjacent to the bottom edge of the draw down card.

12. The method of claim 11, further comprising, after sliding the draw down bar toward the bottom edge to spread the paint on the card, stopping sliding the draw down bar once the paint has spread past the bottom perforated line but before it has spread past the bottom edge of the card and then tearing the draw down card along the bottom perforated line.

13. The method of claim 3, wherein the first and second side perforated lines extend to the top edge.

14. The method of claim 10, further comprising waiting for the paint to dry before tearing the draw down card along the first and second side perforated lines.

15. The method of claim 10, wherein the draw down card further comprises a first hole located adjacent to the top edge and in the first side portion and a second hole located adjacent to the top edge and in the second side portion, further comprising:

hanging the draw down card in a generally vertical orientation using the holes after the step of sliding the draw down bar toward the bottom edge; and then waiting for the paint to dry before tearing the draw down card along the first and second side perforated lines to remove the first and second side portions including the first and second holes.

16. The method of claim 10, wherein the draw down card further comprises a guide marker comprising a straight line on the first surface adjacent to the top edge, wherein the step of placing the draw down bar on the draw down card comprises aligning the draw down bar or a portion thereof with the guide marker.

17. The method of claim 10, wherein the draw down bar comprises a paint application portion having a first end and a second end, wherein the draw down bar is positioned such that the first end is between the first side perforated line and the first edge, and the second end is between the second side perforated line and the second edge.

18. The method of claim 17, further comprising sliding the draw down bar toward the bottom edge of the draw down card such that the paint is spread across the first and second side perforated lines into the first and second ends.

* * * * *